(12) United States Patent
Stewart (10) Patent No.: US 10,292,377 B2
(45) Date of Patent: May 21, 2019

(54) FISHING SYSTEM WITH DEXTERITY PORTION

(71) Applicant: James Patrick Stewart, Walker, LA (US)

(72) Inventor: James Patrick Stewart, Walker, LA (US)

( * ) Notice: Subject to any disclaimer, the term of this patent is extended or adjusted under 35 U.S.C. 154(b) by 777 days.

(21) Appl. No.: 14/815,373

(22) Filed: Jul. 31, 2015

(65) Prior Publication Data

US 2016/0029606 A1 Feb. 4, 2016

Related U.S. Application Data

(60) Provisional application No. 62/031,248, filed on Jul. 31, 2014.

(51) Int. Cl.
*A01K 87/00* (2006.01)
*A01K 87/08* (2006.01)
*A01K 87/06* (2006.01)

(52) U.S. Cl.
CPC ............ *A01K 87/005* (2013.01); *A01K 87/06* (2013.01); *A01K 87/08* (2013.01)

(58) Field of Classification Search
CPC ....... A01K 87/00; A01K 87/08; A01K 87/002
USPC ............... 43/4.5, 18.1 HR, 21.2, 25, 18.1 R
See application file for complete search history.

(56) References Cited

U.S. PATENT DOCUMENTS

| | | | | |
|---|---|---|---|---|
| 2,180,323 A * | 11/1939 | Maxwell | ............... | A01K 87/08 43/23 |
| 2,299,156 A | 10/1942 | Lind | | |
| 2,303,668 A * | 12/1942 | Tilbury | .................. | A01K 91/10 242/252 |
| 2,492,587 A * | 12/1949 | Ledingham | .......... | A01K 87/002 43/20 |
| 2,746,695 A * | 5/1956 | Clay | ...................... | A01K 89/01 242/229 |
| 2,752,717 A * | 7/1956 | Lind | ..................... | A01K 89/015 242/229 |
| 2,783,952 A * | 3/1957 | Clay | ...................... | A01K 89/01 242/233 |
| 3,279,116 A * | 10/1966 | Chapman | ............. | A01K 87/002 43/23 |
| 4,020,581 A * | 5/1977 | Genovese | ............ | A01K 87/002 43/18.5 |
| 4,051,617 A * | 10/1977 | Dorph | .................... | A01K 87/00 43/18.1 R |
| 4,130,960 A | 12/1978 | Fontenot | | |
| 4,697,376 A * | 10/1987 | Brackett | ................ | A01K 87/08 43/18.1 R |
| 5,231,782 A | 8/1993 | Testa | | |
| 5,528,848 A | 6/1996 | Myojo et al. | | |
| 5,806,230 A | 9/1998 | Yasui | | |
| 5,930,940 A | 8/1999 | Yabe et al. | | |
| 5,992,079 A | 11/1999 | Michels et al. | | |

(Continued)

*Primary Examiner* — David J Parsley
*Assistant Examiner* — Danielle A Clerkley
(74) *Attorney, Agent, or Firm* — Hall Estill Attorneys at Law; Tyler J. Mantooth (57) ABSTRACT

A fishing system may have at least a fishing assembly with a handle axially aligned with a reel and a rod. The handle can have a hollow portion and a dexterity portion. The reel may be oriented relative to the handle to position a center of gravity of the fishing assembly in the handle. A fishing line may continuously extend from the reel through the hollow portion, atop the dexterity portion, and along the rod.

18 Claims, 5 Drawing Sheets

(56) References Cited

U.S. PATENT DOCUMENTS

| | | |
|---|---|---|
| 6,050,021 A | 4/2000 | Yasui et al. |
| 6,098,333 A | 8/2000 | Wickizer et al. |
| 6,105,302 A | 8/2000 | Yamamoto et al. |
| 7,007,425 B2 | 3/2006 | Maguire et al. |

* cited by examiner

FISHING SYSTEM WITH DEXTERITY PORTION

RELATED APPLICATION

The present application makes a claim of domestic priority to U.S. Provisional Patent Application No. 62/031,248 filed Jul. 31, 2014, the contents of which are hereby incorporated by reference.

SUMMARY

A fishing system, in some embodiments, has a fishing assembly with a handle axially aligned with a reel and a rod. The handle has a hollow portion and a dexterity portion. The reel is oriented relative to the handle to position a center of gravity of the fishing assembly in the handle. A fishing line continuously extends from the reel through the hollow portion, atop the dexterity portion, and along the rod.

DETAILED DESCRIPTION

Various machines, mechanisms, and components have enabled fishing with increased efficiency and reliability. However, some fishing assemblies can have difficulties during operation that inhibit accuracy and comfort. For example, fishing rods that have unrestrained fishing lines can be cumbersome to manipulate, which can degrade casting accuracy and efficiency. Also, fishing rods with centers of gravity in front of a user's hand can be imprecise to cast and uncomfortable to operate for extended periods of time. Hence, there is a continued industry and consumer interest in a fishing system that provides optimized casting accuracy, casting efficiency, and operating comfort.

Accordingly, a fishing system may be configured with a handle attached to and disposed between a reel and a rod with the handle having hollow and dexterity portions that are each axially aligned with the rod while the dexterity portion extends from the hollow portion with a planar surface through which a continuous line extends from the reel. The hollow and dexterity portions of the handle can individually and collectively be tuned to provide a center of gravity that promotes accurate and efficient casting along with comfortable use. The continuous extension of the line through the dexterity portion of the handle allows for efficient user manipulation of the line against the planar surface, which can aid in detecting a bite, positioning a cast, and setting a hook.

Figure 1:
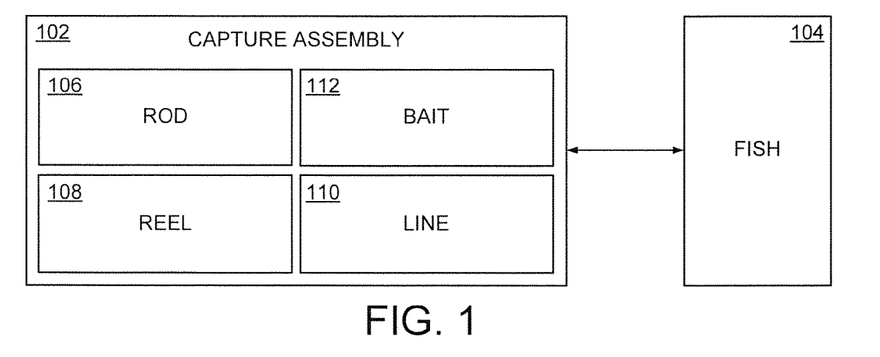
FIG. 1 is a block representation of an example fishing system constructed and operated in accordance with various embodiments.

FIG. 1 provides a block representation of an example fishing system 100 that may be utilized in various embodiments. The fishing system 100 can have one or more capture assemblies 102 that operate to entice, hook, and capture at least one fish 104. The fishing assembly 102 is not limited to a particular number of components with particular shapes, types, or sizes, but some embodiments have a rod 106 attached to at least one reel 108 to allow a line 110 to position bait 112 in assorted positions to entice the fish 104. It is contemplated that one or more hooks, lures, bobbers, and weights may also be incorporated into the fishing assembly 102 without limitation.

The rod 106 may be any length, size, shape, and material that can cast the bait 112 and retract the line 110, such as a circular cross-section fiberglass configuration over three feet in length. The reel 108 can be any size, capacity, and type with one or more manners of retracting the line 110, such as a crank, spring-assisted, and automatic spools, as well as any manner of casting the line 110, such as loose and spring-assisted protraction. Any type, size, strength, and material of line 110 may be stored in the fishing assembly 102, such as about the reel 108, and selectively protracted and retracted to engage in fishing operations. In some embodiments, the bait 112 is organic and live, such as a worm, while other embodiments configure the bait 112 to be inanimate, such as a lure. It is contemplated that multiple different kinds of bait 112 may be concurrently used and that the bait 112 is designed to mimic a creature, such as a minnow, but such configuration is not limiting as the bait 112 may be configured to be attractive to fish without mimicking a creature.

Figure 2:
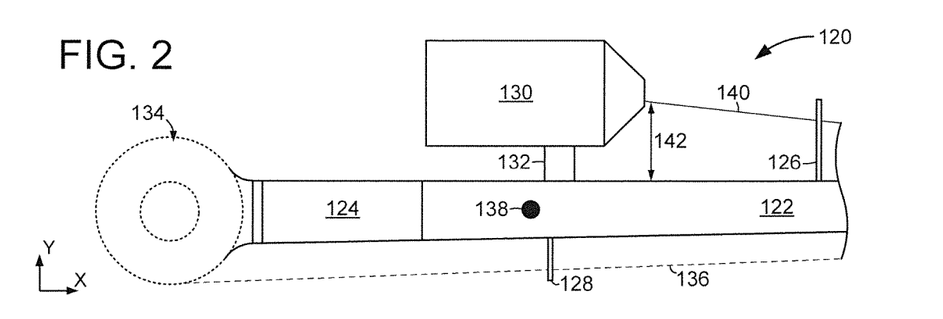
FIG. 2 shows a side view line representation of a portion of an example fishing assembly capable of being used in the fishing system of FIG. 1.

Although a fishing assembly 102 may be configured in an unlimited variety of configurations and utilized in an unlimited variety of environments, assorted embodiments employ the example fishing assembly 120 of FIG. 2, as illustrated as a block representation of a portion of a fishing system. The fishing assembly 120 has a protruding rod 122 that extends along the X axis and has a handle 124 and at least one eyelet 126. As shown, the handle 124 in implemented into the rod 122 without protrusions or recesses. Multiple eyelets 126 and 128 may be respectively positioned on a single side, or opposite sides, of the rod 122. Optionally, the multiple eyelets 126 and 128 may be different sizes and aligned along different positions throughout some or all of the length of the longitudinal axis of the rod 122, which would be parallel with the X axis in FIG. 2.

A reel assembly 130 can be permanently or temporarily attached to the rod 122 via a pedestal 132 that separates the reel assembly 130 from the handle 124 and allows two-handed fishing assembly 120 operation. The segmented lines illustrate how a reel assembly 134 can be mounted to an end of the rod 122 so that a line 136 continuously extends from the reel assembly 134 through the eyelet 128 to an opposite end of the rod 122. The position of the reel assemblies 130 and 134 display how the fishing assembly 120 can be configured in different manners to control the center of gravity 138 of the fishing assembly 120, as shown by the solid dot positioned between the handle 124 and pedestal 132.

The position of the center of gravity 138 can correspond with the efficiency, accuracy, comfort, and feel of the fishing assembly 120. For example, positioning a center of gravity 138 forward of the reel assembly 130, along the X axis, performs differently than a center of gravity being closer to the handle 124, which could correspond with the reel assembly 134 at the end of the rod 122. It is contemplated that the size, position, and weight of the reel assembly 130 can be tuned with respect to the rod 122 size, material, and weight to provide a center of gravity 138 at a predetermined position relative to the rod 122 that corresponds with accurate casting and comfortable line 140 retraction. It can be appreciated that a center of gravity 138 at, or in front of, the reel assembly 130 may provide increased casting power, but can sacrifice fishing assembly 120 comfort as a user would continually be working against the weight of the reel assembly 130.

In various embodiments, the center of gravity 138 is tuned via reel assembly 130 position to be located proximal the handle 124 and longitudinal axis of the rod 122. Such a center of gravity 138 position can provide balanced fishing assembly 120 weighting that increases casting accuracy and comfort, but may reduce casting power compared to a more forward center of gravity 138 along the X axis. The center of gravity 138 may further be tuned by manipulating the height of the reel assembly 130 from the rod 122. That is, the pedestal 132 may be adjustable or fixed to separate the reel assembly 130 from the rod 122 by a predetermined height 142 that contributes to the center of gravity 138 position. It is contemplated that weights and extensions can be incorporated into either reel assembly 130 and 134 to further control the position of the center of gravity 138.

However, tuning the center of gravity 138 by adjusting the size, weight, and type of reel assembly 130 may be inefficient for some fishing environments. For example, a heavy or large reel assembly 130 may not provide enough precision for fishing for smaller fish, such as trout. As another non-limiting example, a lightweight reel assembly 130 may not provide enough casting power for fishing applications in deep sea fishing environments. Hence, various embodiments are generally directed to manners of configuring the center of gravity of the fishing assembly 120 while optimizing the accuracy and precision of casting, hooking, and capturing fish.

Figure 3:
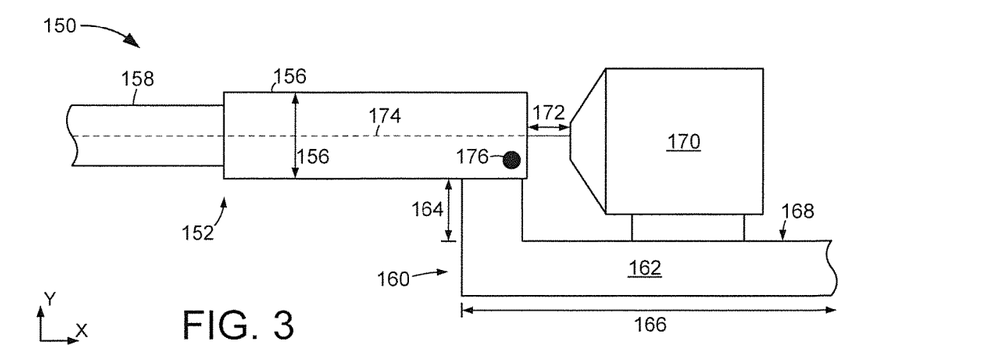
FIG. 3 displays a side view line representation of a portion of an example fishing assembly configured in accordance with assorted embodiments.

FIG. 3 displays a block representation of a portion of an example fishing assembly 150 that may be part of a fishing system in accordance with some embodiments. The fishing assembly 150 has a rod 152 that is partially or completely hollow while presenting a handle portion 154 with an increased diameter 156 compared to a pole portion 158. A balance feature 160 may consist of one or more protrusions 162 that extends beyond the rod 152 by a predetermined vertical 164 and horizontal 166 distances, which may respectively be aligned with the Y and X axes. The size, shape, and weight of the protrusion 162 can be tuned to provide a substantially planar surface 168 onto which a reel assembly 170 can be attached.

Assorted embodiments can allow multiple different mounting locations on the protrusion 162 to position the reel assembly 170 in axial alignment with the longitudinal axis of the rod 152. The mounting location of the reel assembly 170 may also determine the separation distance 172 of the reel assembly 170 from the handle portion 154. The alignment of the reel assembly 170 with the longitudinal axis of the rod 154 can allow a line 174 to extend through some, or all, of the rod 152, which can protect the line 174 from inadvertent snagging and obstruction from items external to the rod 152, such as a user's hand or body. The configuration of the protrusion 162 and position of the reel assembly 170 can tune the location of the center of gravity 176 for the fishing assembly 150. Positioning the reel assembly 170 behind the handle portion 154, and aligned with the longitudinal axis of the rod 152, along the X axis, allows the center of gravity 176 to be located within the handle portion 176, which can provide balanced fishing assembly 150 operation. It is contemplated that the center of gravity 176 is positioned outside the handle portion 154 depending on the desired balance and performance of the fishing assembly 150.

Figure 4:
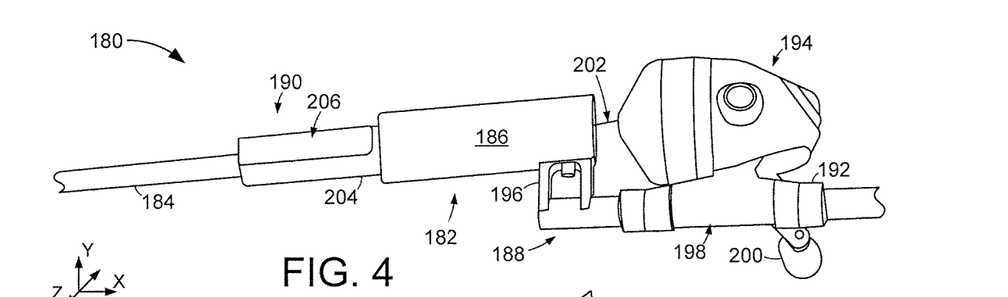
FIG. 4 conveys a perspective view line representation of a portion of an example fishing system constructed in accordance with some embodiments.

While the tuned configuration of the protrusion 162, reel assembly 170, and line 174 can manipulate the position of the center of gravity 176 and protect a portion of the line 174, separation of the line from a user's hand can lack control and feel aspects that contribute to optimized fishing assembly 150 performance. FIG. 4 provides a perspective view block representation of a portion of a fishing system 180 that employs a fishing assembly 182 connected to a fishing pole 184. The fishing assembly 182 is configured in accordance with various embodiments to have a handle 186 disposed between balance 188 and dexterity 190 features. The handle 186 can be rigidly and flexibly connected to the balance feature 188 that positions mounting hardware 192 to allow the reel assembly 194 to be selectively attached and aligned with the longitudinal axis of the handle 186.

The balance feature 188 can have one or more adjustment mounts 196 that allow the balance feature 188 to be adjusted in relation to the handle 186. For example, the mount 196 can allow the balance feature 188 to be rotated, tilted, and tightened with respect to the handle 186, such as with a spring, fastener, or magnets. The mounting hardware 192 is not limited to a particular design, but can consist of threaded connections that allow couplers to engage and secure portions of the reel assembly 194 to the balance feature 188. The mounting hardware 192 may allow a user to shift the position of the reel assembly 194 closer to, or farther away from, the handle 186 along the X axis on the balance protrusion 198 to modify the center of gravity of the fishing system 180 and tune the feel, comfort, and performance of the fishing assembly 182.

As shown, the balance feature 188 and balance protrusion 198 can be configured to allow access to and operation of at least one reel handle 200. It is contemplated that the reel assembly 194 can be attached to an end of the balance protrusion 198, which can position the fishing system 180 center of gravity behind the handle 186, along the X axis. Regardless of the configuration of the balance feature 188, the dexterity feature 190 can be tuned to complement the position of the fishing system 180 center of gravity and the passage of the fishing line 202 through the handle 186. The dexterity feature 190 may be solid, partially hollow, or completely hollow to allow a user to engage and control the fishing line 202.

The dexterity feature 190, in some embodiments, consists of a solid plate 204 of material that provides a substantially planar surface 206 facing the fishing line 202 as it exits the handle 186. That is, the solid plate 204 can be constructed with at least one flat surface 206 that is proximal an exit aperture of the handle 186. The size, orientation, and material of the planar plate surface 206 is not limited to a particular configuration, but may be tuned to accommodate a user's hand or finger, such as a thumb, and provide increased dexterity, such as with a roughened portion or coating, which optimizes the feel and resolution between the plate 204 and the user's hand/finger. For example, a portion of the planar surface 206 can have a greater roughness that increases the efficiency of a user applying pressure to, controlling, and feeling the line 202, which can optimize various fishing operations, such as casting and hooking a fish.

Figure 5:
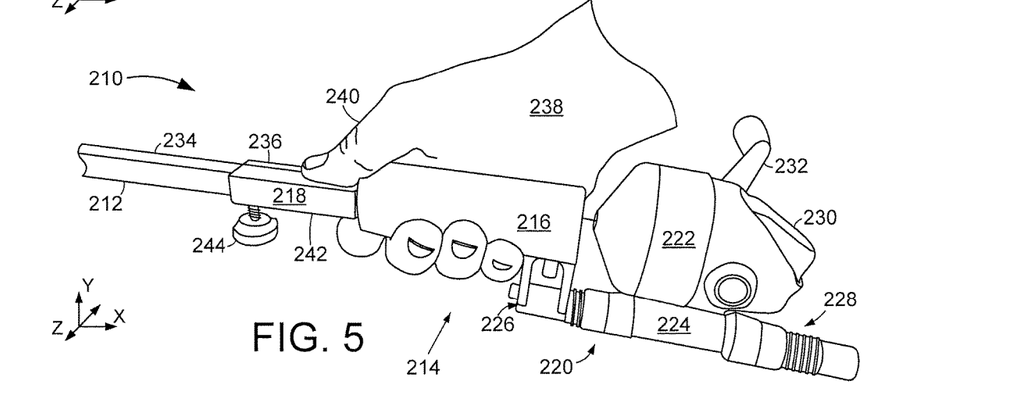
FIG. 5 illustrates a perspective view line representation of a portion of an example fishing system operated in accordance with various embodiments.

FIG. 5 illustrates a perspective view block representation of a portion of a fishing system 210 constructed and operated in accordance with various embodiments. The fishing system 210 has a fishing pole 212 extending from a fishing assembly 214 that consists of a handle 216 disposed between dexterity 218 and balance 220 features. The balance feature 220 is configured to secure a reel assembly 222 to a rod 224 extending from a mount 226 that allows for selective attachment of the rod 224 to the handle 216. For example, the mount 226 can have one or more fasteners that allow the rod 224 to be interchanged.

The rod 224 has a securing mechanism 228 that maintains the reel assembly 222 in alignment with the longitudinal axis of the handle 216 regardless of casting operations involving activation of the line release feature 230 and line retraction with the crank 232. The alignment of the reel assembly 222 with the longitudinal axis of the handle 216 allows the fishing line 234 to freely pass through the handle 216 and onto the planar engagement surface 236 of the dexterity feature 218. As shown, the passage of the fishing line 234 through the handle 216, as opposed to external to the handle 216, allows a user's hand 238 to efficiently and comfortably control the fishing system 210 without concern for impeding the line's 234 protraction and retraction from the reel assembly 222, which can be a safety concern when the line 234 is under tension.

While assorted embodiments pass the fishing line 234 from the reel assembly 222 through the handle 216 to at least one eyelet of the fishing pole 212, other embodiments configure the dexterity feature 218 to continuously extend from the handle 216 and present the planar engagement surface 236 to efficiently allow a user's thumb 240 to contact and apply pressure to the fishing line 234 over a variety of different portions of the engagement surface 236. The tuned configuration of the engagement surface 236 provides diverse engagement options for the user's thumb 240 to contact and control the fishing line 234. For example, the size, shape, and orientation of the engagement surface 236 can allow the user to comfortably contact and control the fishing line 234 with the tip of the thumb 240 as well as with a larger pad portion of the thumb 240, which corresponds to a fingerprint surface of the thumb 240.

The ability to utilize different portions of the thumb 240 to contact the fishing line 236 can allow varying degrees of comfort, pressure, and sensitivity that optimizes the user's fishing experience. It is contemplated that the dexterity feature 218 is adjustable by the user. For instance, an engagement surface 236 providing substrate 242 can be configured to allow modification to the shape, size, weight, and orientation of the engagement surface 236, such as by one or more adjustment features 244. A dexterity feature 218 adjustment feature can be, but is not limited to, a fastener, like a threaded screw or spring-loaded pin, that can modify the configuration of the dexterity feature substrate 242 and may, in some embodiments, connect the fishing assembly 214 to the fishing pole 212.

Figure 6A:
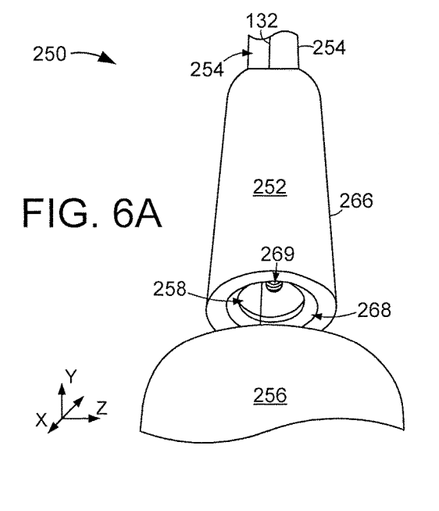
FIGS. 6A and 6B respectively represent perspective views of portions of an example fishing system configured in accordance with assorted embodiments.
Figure 6B:
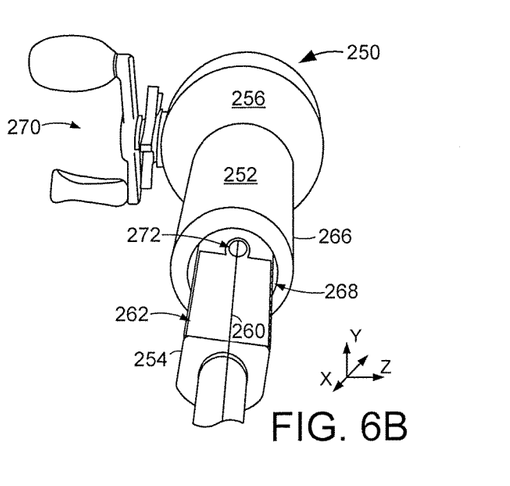

FIGS. 6A and 6B respectively illustrate different perspective views of portions of an example fishing assembly 250 that may be employed in the fishing system 210 of FIG. 5 in accordance with various embodiments. FIG. 6A displays a handle 252 positioned to contact a dexterity feature 254 and a balance feature (not shown) that positions a reel assembly 256 in alignment with an inlet aperture 258 of the handle 252. Positioning the reel assembly 256 along the longitudinal axis of both the handle 252 and dexterity feature 254 allows the fishing line 260 to efficiently extend through the handle 252 and in close proximity to the planar surface 262 of the dexterity feature 254.

That is, the alignment of the reel assembly 256 with the handle can allow the fishing line 260 to be protracted and retracted with minimal friction and drag through the handle 252. In some embodiments, the internal portion of the handle 252 is shaped to tune how the fishing line 260 passes through the handle 252. As a non-limiting example, the handle 252 can be configured with one or more narrowed portions that direct the fishing line 260 through predetermined channels, which can tune the sensitivity, feel, and efficiency of engagement of the fishing line 260 with the planar surface 262 of the dexterity feature 254.

It is contemplated that the handle 252 consists of multiple pieces that are assembled. Such assembly can allow for the various aspects to be interchanged by a user. For instance, one or more attachment features 264 can selectively secure a handle cover 266 to a handle frame 268, which can allow different handle covers 266 to be removed and installed depending on a user's preference by at least one attachment fastener 269, such as a screw. It is contemplated that the attachment feature 264 can further be shaped to guide the fishing line 260 through the handle 252, such as by directing the fishing line 260 toward the planar surface 262. The ability to interchange the handle cover 268 allows covers with different textures, designs, materials, and weights to be utilized at will, such as a handle with a non-slip coating and one or more protrusions shaped to promote finger retention.

Turning to FIG. 6B, the handle 252 is shown from an opposite side compared to FIG. 6A. The perspective of FIG. 6B displays how a reel assembly crank 270 can be positioned relative to the handle 252 and dexterity feature 254 to allow unrestricted access and operation of the reel assembly 256. The perspective of FIG. 6B further displays how the handle frame 268 can be configured to provide an outlet aperture 272 that is smaller than the inlet aperture 258 and positioned to direct the fishing line 260 into close proximity with the planar surface 262, such as 1 cm or less. It should be noted that the handle 252 and dexterity feature 254 are configured in assorted embodiments to allow the fishing line 260 to freely pass over the planar surface 262 without contact unless a user forces the fishing line 260 into contact with the planar surface 262. The distance in which the fishing line 260 is separated from the planar surface 262 without user manipulation can be tuned to provide diverse fishing line 260 control and feel setups for the fishing assembly 250.

In operation, a user can grip the handle 252 and control the fishing line 260 with one hand while another hand operates the reel assembly 256. The ability to control and monitor the fishing line 260 via tactile response of one hand allows the user to engage in other activities while fishing, such as reading a book, eating, drinking, and operating a boat. In the past, a user would need to use a dedicated hand to monitor the fishing line 260 or visually inspect the line 260 for activity, such as a biting fish. The increased precision and sensitivity provided by the fishing assembly 250 allows a single hand to actively or passively monitor the fishing line 260 while controlling the fishing system, which corresponds with an optimized fishing experience that allows the user to tactically sense how bait is performing.

The tuned configuration of the fishing assembly 250 can further optimize the casting capabilities of a fishing system. As a non-limiting example, the ability to concurrently control the fishing line 260 and handle 252 with one hand can allow an additional hand to provide increased casting power compared to having to dedicate the additional hand to controlling the fishing line 260. The one handed operation afforded by the fishing assembly 250 also optimizes casting precision as a user's thumb can be precisely controlled to release the fishing line 260 at various positions during a cast to place bait in a precise physical location. Thumb control of the fishing line 260 may further optimize trolling activities where additional line is slowly let out while bait is in the water by allowing precise thumb control of line pressure and speed.

Figure 7A:
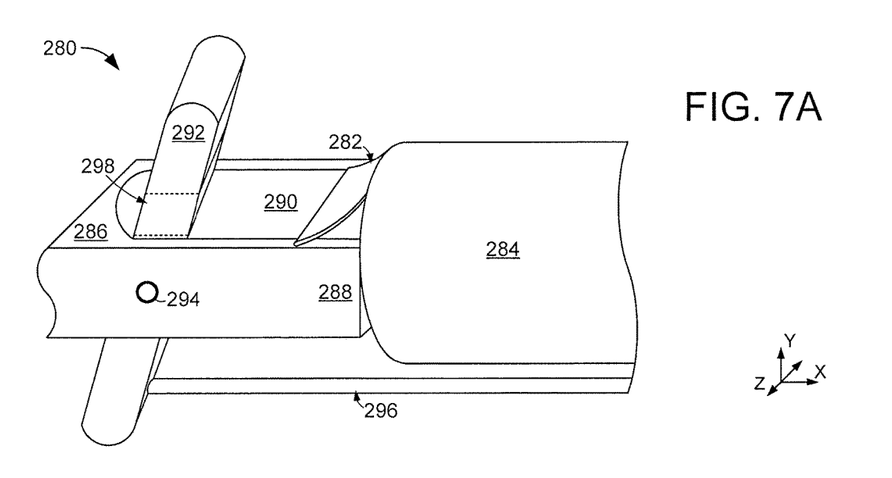
FIGS. 7A and 7B respectively provide line representations of portions of an example fishing assembly constructed in accordance with some embodiments.
Figure 7B:
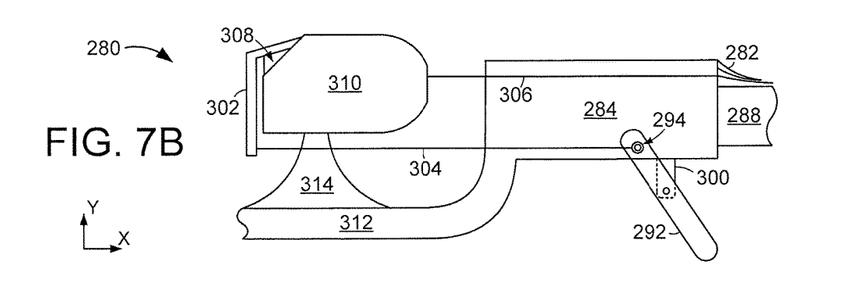

FIGS. 7A and 7B respectively depict block representations of portions of an example fishing assembly 280 that employs a line guide 282 in accordance with assorted embodiments. As shown in FIG. 7A, a line guide 282 can continuously extend from a portion of the handle 284 towards a planar surface 286 of a dexterity feature 288. The line guide 282 can be one or more pieces that are shaped to selectively modify the path of fishing line towards the planar surface 286. In some embodiments, the planar surface 286 has a recess 290 that is shaped to promote contact and comfort with a user's thumb. It is contemplated that the recess 290 has a continuously curvilinear surface and a surface texture that promotes fishing line retention, such as a milled, roughened, or coated texture.

Through tuned configuration of the line guide 282, fishing line protraction and retraction through the handle 284 can be slightly or completely impeded to increase the amount of time, or decrease the amount of pressure, corresponding with controlling the fishing line. In other words, the line guide 282 can temporarily and permanently slow fishing line movement as well as reduce the amount of pressure a user would need to apply to slow or stop fishing line movement. Such line guide 282 capabilities can be tuned by manipulating the shape, surface texture, weight, tension, and distance relative to the planar surface 286.

Various embodiments configure the line guide 282 to be selectable and adjustable. That is, the line guide 282 can be configured to have a deployed state that engages a fishing line and a passive state that separates the line guide 282 from the fishing line. It is contemplated that various different line guides 282 can be individually or collectively installed to tune the position and amount of force imparted by the line guide 282. The line guide 282 may be spring loaded between the deployed and passive states, which can allow for efficient selection by a user. The ability to selectively activate and tune the operation of the line guide 282 can allow a user to customize the fishing system feel, comfort, and performance for a diverse variety of fishing environments.

As shown by plate 292, one or more separate or collective pieces can extend from the dexterity feature 288 to provide a selection trigger. It is contemplated that the plate 292 extends in one or more directions from a pivot point 294 of the dexterity feature 288 and is connected to at least one selection feature 296 that extends to the reel assembly (not shown) of the fishing assembly 280 to modify the status of the reel assembly. In other words, the plate 292 may be configured as a trigger that can be selected by a user with one hand to alter the reel assembly. The selection feature 296 is not limited to a particular configuration or mechanism, but in some embodiments is a pole or cable that applies pressure to the reel assembly to release fishing line. As a non-limiting example, the selection feature 296 may continuously extend through the handle 284 and engage the reel assembly with the application of pressure onto the plate 292.

The selection feature 296 can be constructed with one or more hinges, pivots, springs, and cams to apply pressure onto the reel assembly in a mariner that effectuates release of the fishing line. The ability to manipulate the plate 292 with one hand allows the releasing of fishing line from the reel assembly and casting entirely with one hand, as opposed to two-handed operation where one hand holds the fishing pole and another hand releases the fishing line from the reel assembly. The plate 292 may be configured to allow the passage of fishing line through or around various portions. In the embodiment displayed in FIG. 7A, an aperture 298 continuously extends through the plate 292 and has a shape and size conducive to the efficient protraction and retraction of fishing line without being impeded by the plate 292. It is contemplated that the plate 292 may be have a pressure aid, such as a spring or hydraulic piston, that allows for efficient and precise actuation of the reel assembly via the selection feature 296.

In FIG. 7B, the plate 292 is alternatively configured to extend from within the handle 284 to a predetermined trigger position below the handle 284 by being mounted to a brace 300. The plate 292 is attached to at least one release feature 302 via a release line 304, which may be a flexible or rigid component, such as a metal rod, that translates rearward motion of the plate 292 into forward motion of the release feature 302. The release feature 302 and line 304 can be tuned to engage one or more fishing line 306 release mechanisms 308 of a reel assembly 310 upon activation of the plate 292.

Positioning the plate 292 on the bottom side of the handle 284, as shown in FIG. 7B, and having the release line 304 extend through the handle 284 can correspond with the reel assembly 310 being raised from a balance rod 312 via a reel pedestal 314. In other words, the reel pedestal 314 can be tuned for position and size to allow both the fishing line 306 and release line 304 to concurrently extend within the handle 284 and move in opposite directions. It is contemplated that the plate 292 can be configured for size, position, material, and shape to allow tuned engagement and disengagement of the reel release mechanism 308. For example but in no way limiting, the plate 292 can be continuously curvilinear and spring-loaded to provide positive tension for applying force to the release mechanism 308 and allowing a predetermined amount of fishing line 306 out of the reel assembly 310 before the plate 292 is released and the release mechanism 308 automatically resets to halt protraction of the fishing line 306.

Figure 8:
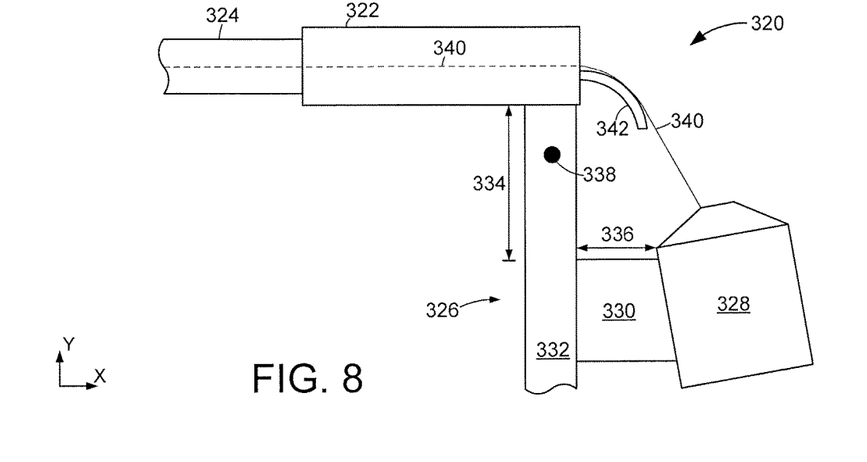
FIG. 8 shows a line representation of a portion of an example fishing assembly configured in accordance with various embodiments.

FIG. 8 is a side view block representation of a portion of an example capture feature 320 configured in accordance with some embodiments. As illustrated, a handle 322 is positioned to contact a dexterity feature 324 and a balance feature 326. In comparison with the balance feature of FIGS. 2-5 that respectively extend parallel to a longitudinal axis of the handle 322, the balance feature 326 extends perpendicular to the handle's longitudinal axis along the X-Y plane. It is contemplated that the balance feature 326 extends at an angle between 0-90 with respect to the handle 322, but such configuration is not required or limiting.

The orientation of the balance feature 326 can position a reel assembly 328 in an angled orientation relative to the handle 322 and dexterity feature 324. The location of the reel assembly 328 can be maintained by a permanent or adjustable pedestal 330 that is secured to a balance rod 332 and positions the reel assembly 328 predetermined separation distances 334 and 336 from the handle 322 and balance rod 332, respectively. The separation distances 334 and 336 can complement the orientation of the reel assembly 328 to provide a custom balance and feel of the fishing assembly 300, as shown by the center of gravity 338 being located below the handle 322.

With the reel assembly 328 being positioned below the handle 322 on the X-Y axis, fishing line 340 can be guided into an internal portion of the handle 322 by one or more guides 342. The size, number, and shape of the guide 342 is not limited, but can be configured as a funnel in various embodiments that reduces in diameter to orient the fishing line 340 along the X axis and longitudinal axis of the handle 322. The ability to tune the center of gravity 338 and the shape of the capture feature 320 by orienting the balance rod 332 orthogonal, or angled, with respect to the handle 322 illustrates how balance, efficiency, and comfort can be collectively customized in a diverse variety of manners.

Regardless of the configuration of a fishing assembly, various embodiments conduct a fishing routine by initially attaching bait to a fishing line. The routine may alternatively begin by stringing a reel assembly, fishing assembly, and fishing pole with fishing line before one or more hooks or lures are installed. The attachment of bait, or a lure, to the fishing line can allow a user to release the fishing line from the reel assembly. A cast can then be made with or without a user's hand, or finger, controlling the fishing line until a user defined moment that corresponds with the positioning of the bait at a specific physical location. For example, the user can keep the fishing line from protracting from the reel assembly via contact with the fishing line and the planar surface of the dexterity feature until the user releases the fishing line and momentum from the cast propels the bait to a predetermined location.

With the bait in water, the user can retract the fishing line with the reel, retract the fishing line by hand, or let out additional line. The protraction of additional fishing line can correspond with the user selectively applying pressure to the fishing line against the dexterity feature. It is contemplated that the user maintains contact with the fishing line against the dexterity feature and monitors fishing line behavior via tactile sensing. Upon belief that the bait is in position to hook a fish, the user can either retract the fishing line with the reel assembly or move the fishing system while the fishing line is maintained in contact with the dexterity feature. The hooking of a fish can then proceed to the retracting of the fishing line and the fish via articulation of the reel assembly. In some embodiments, fishing line retraction corresponds with sporadic or continuous tactile monitoring of the fishing line for fish movement via light pressure against the dexterity feature.

It can be appreciated that through the various configurations, the feel, comfort, and performance of the fishing system can be optimized. The ability to tune the center of gravity can provide balance to the fishing system and complement the passage of a fishing line through a handle of the fishing assembly. The ability to control and feel the fishing line against the dexterity feature allows for precise casting and increased sensitivity for identifying the status of bait underwater. Additionally, the various adjustments available for a fishing assembly can customize the balance and performance of a fishing system to allow optimized single hand operation with increased fishing line control.

Figure 9:
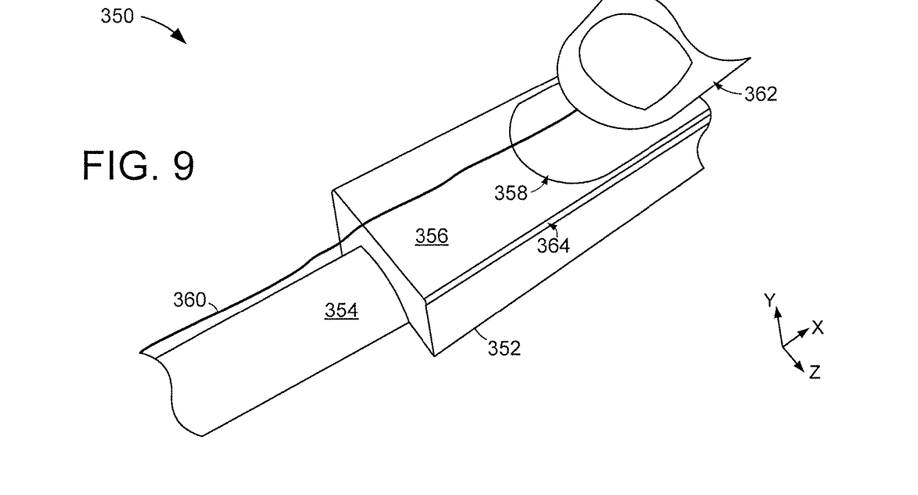
FIG. 9 is a perspective view line representation of a portion of an example fishing system configured in accordance with some embodiments.

FIG. 9 displays a perspective view line representation of a portion of an example fishing assembly 350 constructed and operated in accordance with various embodiments. The fishing assembly 350 has a dexterity feature 352 connected to a rod 354. The dexterity feature 352 has a planar surface 356 that is shaped with one or more recesses 358 to allow efficient engagement and retention of the fishing line 360 with a finger 362 of a user. The recess 360 can be any size, shape, and position on the dexterity feature 352 to increase sensitivity and comfort for the user.

For example, the recess 358 can have a roughened surface texture or be coated with a material that differs from the dexterity feature 352 to increase friction between the user's finger 362 and the dexterity feature 352. The ability to shape the dexterity feature 356 may further involve beveling one or more edges with a chamfer surface 364 that reduces weight of the fishing system 350 while decreasing the risk of inadvertent fishing line 360 trauma, such as cuts and snags.

Figure 10:
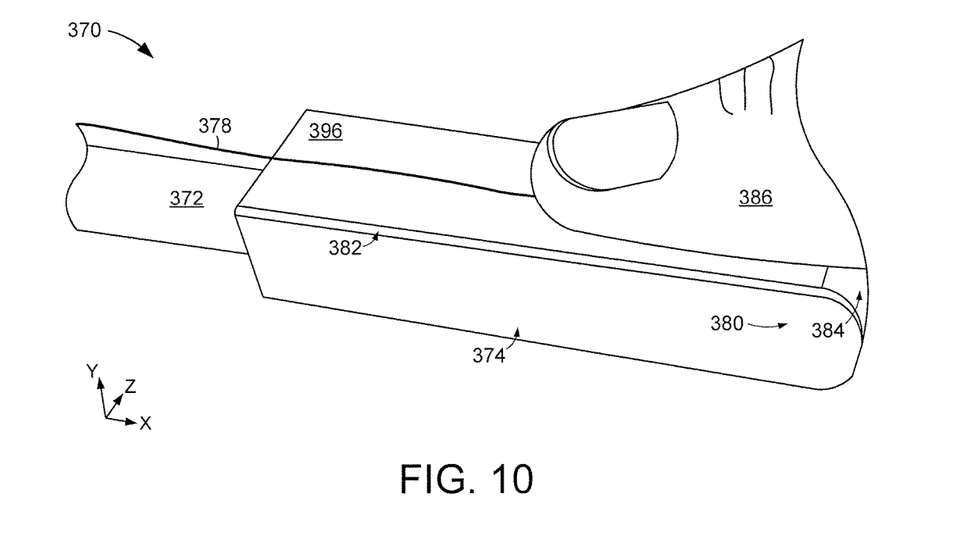
FIG. 10 depicts a perspective line representation of a portion of an example fishing system configured in accordance with assorted embodiments.

FIG. 10 shows a perspective view line representation of a portion of an example fishing assembly 370 configured in accordance with some embodiments to increase the comfort, sensitivity, and performance of a fishing system. As shown, a rod 372 extends from a dexterity feature 374 that has a planar surface 376 facing a fishing line 378 and shaped rear feature 380. The rear feature 380 is configured as an extension of a chamfered edge 382 that transitions to a continuously curvilinear rear surface 384. It is contemplated that the rear feature 380 transitions into a hollow handle, but such arrangement is not required or limiting. Through the configuration of the dexterity feature 374, a user can gain increased fishing line sensitivity along with heightened retention during casting and setting bait.

Figure 11:
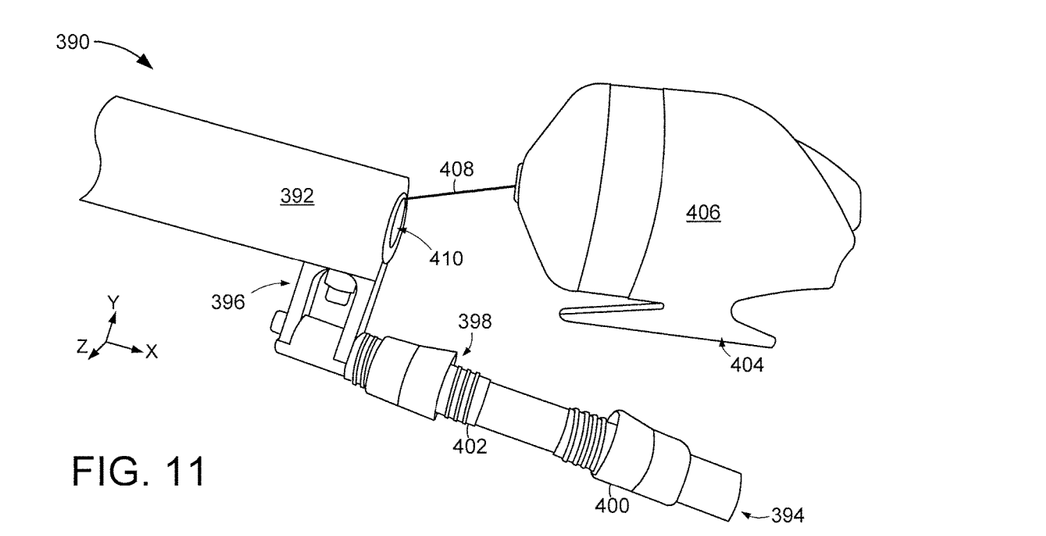
FIG. 11 illustrates a line representation of a portion of an example fishing system arranged in accordance with some embodiments.

Turning to FIG. 11, a portion of an example fishing system 390 is depicted in a line representation. The system 390 has a hollow handle 392 that is removably attached to a balance feature 394 via an adjustable fastener 396, such as a screw or pin. The balance feature 394 has a reel retention mechanism 398 that provides a pair of shaped retention collars 400 that can be articulated via threads 402 to engage, and disengage a pedestal 404 portion of a reel 406.

The disassembled illustration of FIG. 11 shows how the retention mechanism 398 can be manipulated to allow the reel 406 to be separated from the balance feature 394 without the fishing line 408 being removed from the handle aperture 410. The ability to remove the reel 406 allows the balance feature 394 and/or handle 392 to be adjusted at will.

Figure 12:
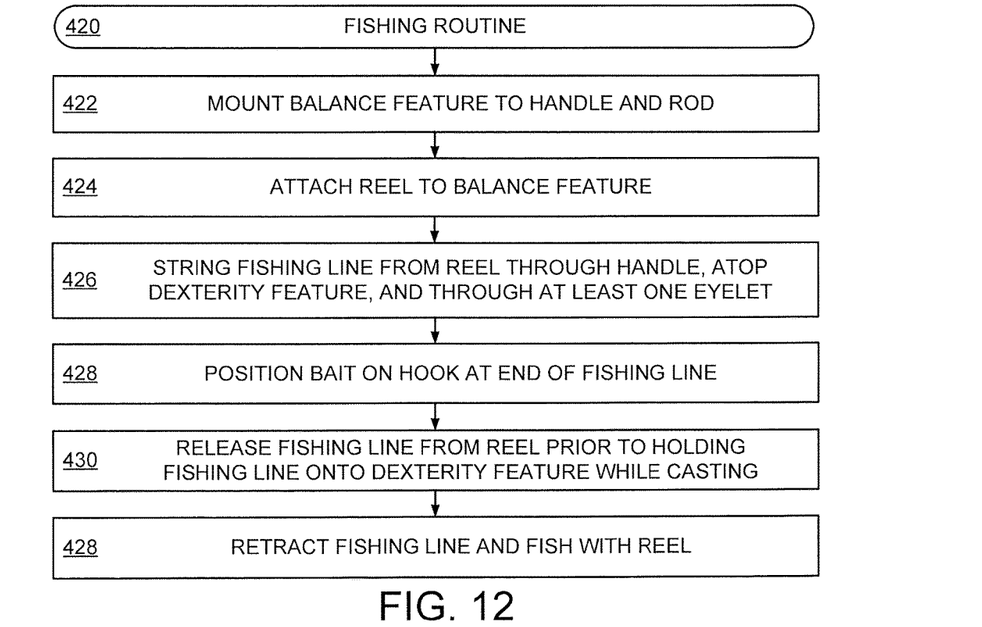
FIG. 12 provides a flowchart of an example fishing routine that may be carried out with a fishing system in accordance with various embodiments.

FIG. 12 is a flowchart of an example fishing routine 420 that can be executed in various embodiments to utilize a fishing assembly to efficiently catch fish. The routine begins with step 422 mounting a balance feature to a handle assembly that comprises a rod, hollow handle, and dexterity feature. The balance feature can be fastened to the handle assembly by one or more adjustable members that allow for articulation of the position and feel of a reel attached to the balance feature in step 424. That is, the balance feature can be adjustable so that a user can manipulate the position of a center of gravity of the fishing system, such as within the hollow handle.

It is noted that step 424 can align a fishing line aperture of the reel with the aperture of the hollow handle, as shown in FIGS. 3-7B. The attachment of the reel to the handle proceeds to step 426 where fishing line is extended from the reel through the handle, atop the dexterity feature, and through at least one eyelet of the rod. The fishing line can be kept in position by a user's finger applying pressure on the dexterity feature or by the reel being locked while step 428 baits a hook tied to the fishing line, distal the reel.

Next, the fishing line is released from the reel, but secured in place by a user's finger applying pressure to secure the fishing line onto the dexterity feature during step 430. The secured fishing line allows movement of the rod to build momentum that results in casting the bait when the user's finger releases the fishing line in step 430. The ability to cast the bait by holding the fishing line against the dexterity feature, instead of holding down a release feature of the reel, provides more accurate casting direction and speed. After the bait is positioned in water and a fish engages the bait, step 432 sets the bait with movement of the rod and subsequently retracts the fishing line with the reel.

It is contemplated that the user monitors the status of the bait in the water by squeezing the fishing line between a finger and the dexterity feature, which provides instant and exact feedback that is not possible by monitoring the reel or rod. While the steps of routine 420 can execute fishing operations, the various aspects are not limited or required, as such any step can be modified or removed just as any step or decision can be added to the routine 420. For instance, an additional step can adjust the reel with respect to the handle to relocate the location of the center of gravity for the fishing system.

What is claimed is:

1. An apparatus comprising:
   a fishing assembly comprising a handle axially aligned with a reel and a rod, the reel removably attached to a balance feature via a reel retention mechanism comprising an articulable collar, the balance feature connected to the rod via an adjustable fastener, the adjustable fastener configured to allow the balance feature to be adjusted in relation to the handle, the handle comprising a hollow portion, a trigger, and a dexterity portion, the trigger connected to a release feature of the reel via a release line continuously extending through a center of the hollow portion, the reel oriented relative to the handle to position a center of gravity of the fishing assembly in the handle; and
   a fishing line continuously extending from the reel through the hollow portion, atop the dexterity portion, and along the rod.

2. The apparatus of claim 1, wherein the fishing line is continuously aligned with a longitudinal axis of the rod and a center of the hollow portion.

3. The apparatus of claim 1, wherein a center of the reel is aligned with a center of the hollow portion.

4. The apparatus of claim 1, wherein the dexterity portion continuously extends from the hollow portion to the rod, the dexterity portion exposing the fishing line to a user.

5. The apparatus of claim 4, wherein the dexterity portion comprises a planar surface oriented to contact the fishing line in response to selection by the user.

6. The apparatus of claim 4, wherein the dexterity portion has at least one recess shaped to accommodate a finger of the user.

7. The apparatus of claim 4, wherein the dexterity portion comprises a surface texture configured to increase friction between the fishing line and a finger of the user.

8. The apparatus of claim 1, wherein the rod attaches to the handle via a selectable fastener extending through the dexterity portion.

9. The apparatus of claim 1, wherein the reel is oriented perpendicular to a longitudinal axis of the rod and handle.

10. An apparatus comprising a fishing assembly comprising a handle axially aligned with a reel and a rod, the reel removably attached to a balance feature via a reel retention mechanism comprising an articulable collar, the handle comprising a hollow portion, a trigger, and a dexterity portion, the trigger connected to a release feature of the reel via a release line continuously extending through a center of the hollow portion, the reel oriented relative to the handle to position a center of gravity of the fishing assembly in the handle, a fishing line continuously extending from the reel through the hollow portion, atop the dexterity portion, and along the rod.

11. The apparatus of claim 10, wherein the trigger comprises an aperture through which the fishing line extends.

12. The apparatus of claim 10, wherein the handle further comprises a line guide extending from the hollow portion to direct the fishing line towards a planar surface of the dexterity portion.

13. The apparatus of claim 10, wherein the rod comprises at least one eyelet through which the fishing line extends.

14. A method comprising:
    attaching a reel to a balance feature by articulating a reel retention mechanism of the balance feature to position a center of gravity of a fishing assembly in a first position within a handle, the balance feature extending from the handle, the reel axially aligned with the handle, the handle comprising a hollow portion and a dexterity portion, the retention mechanism, reel, and balance feature positioned external to the handle;
    passing a fishing line continuously from the reel through the hollow portion, atop the dexterity portion, and along the rod;
    separating the reel from the balance feature by articulating the reel retention mechanism while the fishing line continuously extends through the handle;
    adjusting the position of the balance feature relative to the handle via an adjustable fastener; and
    securing the reel to the balance feature via the reel retention mechanism to position the center of gravity of the fishing assembly in a second position within the handle, the first and second positions being different.

15. The method of claim 14, wherein a user selects a release feature of the reel prior to the fishing line being pinned on the dexterity portion via the user applying pressure on the fishing line and a planar surface of the dexterity portion.

16. The method of claim 15, wherein the release feature remains selected while bait attached to the fishing line is cast by the user.

17. The method of claim 16, wherein the user removes pressure from the planar surface to extend a length of the fishing line from the reel through the hollow portion.

18. The method of claim 15, wherein the user sets a hook in a fish by retaining the fishing line in contact with the planar surface while moving the rod.

* * * * *